(12) United States Patent
Goto et al.

(10) Patent No.: US 12,162,276 B2
(45) Date of Patent: Dec. 10, 2024

(54) RECORDING APPARATUS, RECORDING/READING SYSTEM AND RECORDING METHOD

(71) Applicant: SEIKO EPSON CORPORATION, Tokyo (JP)

(72) Inventors: Atsushi Goto, Nagano (JP); Eiichi Ohara, Nagano (JP)

(73) Assignee: Seiko Epson Corporation, Tokyo (JP)

(*) Notice: Subject to any disclaimer, the term of this patent is extended or adjusted under 35 U.S.C. 154(b) by 134 days.

(21) Appl. No.: 17/935,942

(22) Filed: Sep. 28, 2022

(65) Prior Publication Data

US 2023/0101942 A1 Mar. 30, 2023

(30) Foreign Application Priority Data

Sep. 30, 2021 (JP) ................................. 2021-160803

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC ..... B41J 2/0451; B41J 2/04586; B41J 2/2135
See application file for complete search history.

(56) References Cited

U.S. PATENT DOCUMENTS

| 2015/0350460 A1 | 12/2015 | Hirata et al. | |
| 2021/0291515 A1* | 9/2021 | Kondo | B41J 2/2132 |
| 2022/0088939 A1* | 3/2022 | Yoshikawa | B41J 2/04505 |

FOREIGN PATENT DOCUMENTS

JP 2015-225285 A 12/2015

* cited by examiner

*Primary Examiner* — Sharon Polk
(74) *Attorney, Agent, or Firm* — Global IP Counselors, LLP

(57) ABSTRACT

A recording apparatus includes a first nozzle row and a second nozzle row, and a control unit configured to control ejection of liquid, the control unit is configured to cause the nozzle row to perform scan of ejecting the liquid while moving, and when recording a first pattern including a first overlapping region and a first normal region by controlling the first nozzle row and recording a second pattern including a second overlapping region and a second normal region by controlling the second nozzle row, the first overlapping region is formed at a position overlapping the second normal region as viewed in a longitudinal direction, the first overlapping region being an overlapping region where a raster line is formed by performing the scan m times, the first normal region being where the raster line is formed by performing the scan n times, n being smaller than m.

8 Claims, 8 Drawing Sheets

RECORDING APPARATUS, RECORDING/READING SYSTEM AND RECORDING METHOD

The present application is based on, and claims priority from JP Application Serial Number 2021-160803, filed Sep. 30, 2021, the disclosure of which is hereby incorporated by reference herein in its entirety.

BACKGROUND

1. Technical Field

The present disclosure relates to a recording apparatus, a recording/reading system and a recording method.

2. Related Art

By optically reading the recorded material output by a printer with a reading apparatus, the color, density, etc. of the recorded material can be obtained and evaluated. At this time, if foreign matter such as dust adheres to the reading apparatus, the reading result of the foreign matter is incorporated into the data as the reading result of the recorded material, and the recorded material cannot be accurately read.

JP-A-2015-225285 discloses an imaging apparatus that reads the same side of the same sheet after image formation inline with a colorimeter capable of reading only a part of the area in the main scanning direction and a line sensor capable of reading over the width of the image formation in the main scanning direction, and the imaging apparatus has a configuration that detects the presence or absence of abnormal values based on the read information read by the line sensor, and displays a message urging the user to clean the line sensor and colorimeter when abnormal values are detected at the same location in the main scanning direction where the abnormal values were detected for a predetermined number of times or more (see JP-A-2015-225285).

JP-A-2015-225285 requires a line sensor to clean foreign matter adhering to the colorimeter, and increases cost due to the provision of two sensors for image reading. In view of this situation, there is a need for a technique that can help detect foreign matter adhering to the sensor for image reading while controlling costs.

SUMMARY

A recording apparatus includes a first nozzle row and a second nozzle row including a plurality of nozzles configured to eject liquid to a medium, and a control unit configured to control ejection of the liquid by the first nozzle row and the second nozzle row. The control unit is configured to cause the first nozzle row and the second nozzle row to perform scan of ejecting the liquid while moving forward or backward along a predetermined main scanning direction, and when the control unit records a first pattern including a first overlapping region and a first normal region on the medium by controlling the first nozzle row and records a second pattern including a second overlapping region and a second normal region on the medium by controlling the second nozzle row, the control unit forms the first overlapping region at a position overlapping the second normal region as viewed in a longitudinal direction, the first overlapping region being an overlapping region where a raster line having a longitudinal direction corresponding to the main scanning direction is formed by performing the scan m times, the first normal region being a normal region where the raster line is formed by performing the scan n times, n being smaller than m, the second overlapping region being the overlapping region, the second normal region being the normal region.

A recording apparatus includes a first nozzle row, a second nozzle row, a third nozzle row and a fourth nozzle row in which a plurality of nozzles configured to eject liquid to a medium are arranged in an arrangement direction of the nozzles, and a control unit configured to control ejection of the liquid by the first nozzle row, the second nozzle row, the third nozzle row and the fourth nozzle row. When the control unit records a first pattern including a first normal region and a first overlapping region on the medium by controlling the first nozzle row and the second nozzle row and records a second pattern including a second normal region and a second overlapping region on the medium by controlling the third nozzle row and the fourth nozzle row, the control unit forms the first overlapping region at a position overlapping the second normal region as viewed in a longitudinal direction, the first normal region being a region where a raster line having a longitudinal direction corresponding to a direction intersecting an arrangement direction of the nozzles is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

A recording/reading system includes the recording apparatus, a reading unit configured to read the first pattern and the second pattern recorded on the medium by the recording apparatus, and a detection unit configured to detect foreign matter at the reading unit, based on a reading result of the first pattern and the second pattern from the reading unit.

A recording method is a method of a recording apparatus configured to perform recording by controlling ejection of liquid by a first nozzle row and a second nozzle row including a plurality of nozzles configured to eject the liquid to a medium, the recording method includes a pattern recording step of recording a pattern on the medium by causing the first nozzle row and the second nozzle row to perform scan of ejecting the liquid while moving forward or backward along a predetermined main scanning direction. In the pattern recording step, when recording a first pattern including a first overlapping region and a first normal region on the medium by controlling the first nozzle row and recording a second pattern including a second overlapping region and a second normal region on the medium by controlling the second nozzle row, the first overlapping region is formed at a position overlapping the second normal region as viewed in a longitudinal direction, the first overlapping region being an overlapping region where a raster line having a longitudinal direction corresponding to the main scanning direction is formed by performing the scan m times, the first normal region being a normal region where the raster line is formed by performing the scan n times, n being smaller than m, the second overlapping region being the overlapping region, the second normal region being the normal region.

A recording method is a method of a recording apparatus configured to perform recording by controlling ejection of liquid by a first nozzle row, a second nozzle row, a third nozzle row and a fourth nozzle row in which a plurality of nozzles configured to eject the liquid to a medium are arranged in an arrangement direction of the nozzles, the recording method includes a pattern recording step of recording a pattern on the medium by causing the first nozzle row, the second nozzle row, the third nozzle row and the fourth nozzle row to eject the liquid. In the pattern recording step, when recording a first pattern including a first normal region and a first overlapping region on the medium by controlling the first nozzle row and the second nozzle row and recording a second pattern including a second normal region and a second overlapping region on the medium by controlling the third nozzle row and the fourth nozzle row, the first overlapping region is formed at a position overlapping the second normal region as viewed in a longitudinal direction, the first normal region being a region where a raster line having a longitudinal direction corresponding to a direction intersecting an arrangement direction of the nozzles is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

DESCRIPTION OF EXEMPLARY EMBODIMENTS

An embodiment of the present disclosure is described below with reference to the drawings. Note that the drawings are merely examples for describing the embodiment. Since the drawings are examples, they may be provided with incorrect proportions and shapes, may mismatch each other, and may be partially omitted.

1. Outline Description of System

Figure 1:
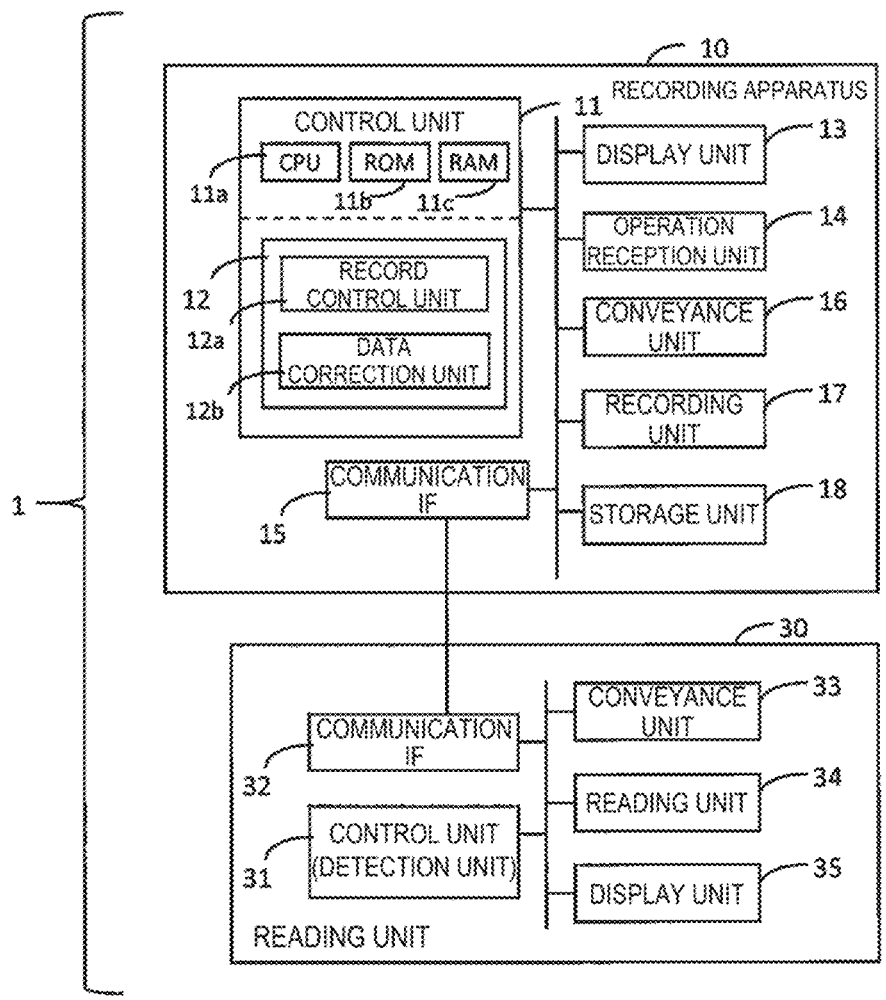
FIG. 1 is a block diagram schematically illustrating a system configuration of the embodiment.

FIG. 1 is a diagram schematically illustrating a configuration of a recording/reading system 1 of the embodiment. The recording/reading system 1 may be referred to as foreign matter detection system 1, data correction system 1 or the like. The recording/reading system 1 includes a recording apparatus 10 and a reading apparatus 30. The recording apparatus 10 executes a recording method of the embodiment.

The recording apparatus 10 includes a control unit 11, a display unit 13, an operation reception unit 14, a communication IF 15, a conveyance unit 16, a recording unit 17, a storage unit 18 and the like. IF is an abbreviation of interface. The control unit 11 includes one or a plurality of ICs including a CPU 11a serving as a processor, a ROM 11b, a RAM 11c and the like, other nonvolatile memories and the like. At the control unit 11, the processor, i.e., the CPU 11a, executes arithmetic processing in accordance with a program 12 stored in the ROM 11b, other memories and the like, with the RAM 11c and the like used as a working area.

In accordance with the program 12, the control unit 11 implements a plurality of functions such as a record control unit 12a and a data correction unit 12b. These functions are only some of the functions that the program 12 causes the control unit 11 to implement. Note that the processor is not limited to one CPU, and may have a configuration of performing processing with a plurality of CPUs or a hardware circuit such as an ASIC, or a configuration of performing processing with a CPU and a hardware circuit in conjunction with each other.

The display unit 13 is a means for displaying visual information, and is composed of a liquid crystal display, an organic EL display or the like, for example. The display unit 13 may have a configuration including a display and a driving circuit for driving the display. The operation reception unit 14 is a means for receiving the user operation, and is implemented with physical buttons, touch panel, mouse, keyboard and the like, for example. Naturally, the touch panel may be implemented as one function of the display unit 13. A configuration including the display unit 13 and the operation reception unit 14 may be referred to as the operation panel of the recording apparatus 10. The display unit 13 and/or the operation reception unit 14 may be a part of the configuration of the recording apparatus 10, or may be a peripheral device externally attached to the recording apparatus 10.

The communication IF 15 is a collective term of one or a plurality of IFs for the recording apparatus 10 to communicate with other apparatuses in a wired or wireless manner in compliance with a predetermined communication protocol including publicly known communication standards. In the example illustrated in FIG. 1, the recording apparatus 10 is connected to the reading apparatus 30 through the communication IF 15. The recording apparatus 10 may be connected to and communicate with various external apparatuses not illustrated in FIG. 1 through the communication IF 15 as well as the reading apparatus 30.

The conveyance unit 16 is a means for conveying a recording medium along a predetermined conveyance direction under the control of the control unit 11, and includes, for example, a roller that conveys a medium through rotation and a motor for driving the roller and the like not illustrated in the drawing. The medium is typically a sheet, but may be materials other than paper as long as recording on the medium with liquid can be performed.

The recording unit 17 is a mechanism that performs recording on a medium by ejecting liquid such as ink by an ink-jet system. The recording unit 17 includes a recording head 20 as described later. The recording head 20 includes a plurality of nozzles 21 for ejecting liquid, and ejects the liquid from each nozzle 21 to a medium 40 being conveyed by the conveyance unit 16 under the control of the control unit 11. The droplet ejected by the nozzle 21 is also referred to as dot. The recording head 20 may be referred to as liquid ejection head, printing head, print head, ink-jet head and the like.

The storage unit 18 is a storage means composed of a hard disk drive, a solid-state drive, and/or other memories, for example. A part of the memory provided in the control unit 11 may be regarded as the storage unit 18. The storage unit 18 may be regarded as a part of the control unit 11.

The reading apparatus 30 includes a control unit 31, a communication IF 32, a conveyance unit 33, a reading unit 34, a display unit 35 and the like. As with the control unit 11, the control unit 31 includes a processor, a memory, a program and the like mounted therein, which control the reading apparatus 30 in conjunction with each other. The communication IF 32 is a collective term of one or a plurality of IFs for the reading apparatus 30 to communicate with other apparatuses in a wired or wireless manner in compliance with a predetermined communication protocol including publicly known communication standards. In the example illustrated in FIG. 1, the communication IF 32 is connected to the communication IF 15 of the recording apparatus 10.

As with the display unit 13, the display unit 35 is a means for displaying visual information. Naturally, the reading apparatus 30 may include an operation reception unit. The conveyance unit 33 is a means for conveying the document to be read along a predetermined conveyance direction under the control of the control unit 31, and includes a roller that conveys documents through rotation, a motor for driving the roller and the like not illustrated in the drawing, for example. The medium 40 after the recording of the recording apparatus 10 becomes a kind of document for the reading apparatus 30. In the following description, a document read by the reading apparatus 30 may be referred to as the medium 40.

The reading unit 34 is a mechanism for optically reading a document conveyed by the conveyance unit 33. Although details are omitted, the reading unit 34 includes a light source for irradiating document, an image sensor that receives reflection light and transmitted light from the document through a predetermined reading surface and generates an electric signal through optoelectronic conversion, an image processing circuit that generates read image data as a reading result of a document by performing a predetermined conversion and correction on the electric signal output from the image sensor, and the like. The image processing circuit may be a part of the control unit 31. When foreign matter adheres to the reading surface of the reading unit 34 for reading documents and the like, the document cannot be properly read. The image sensor is a line sensor that is long in the width direction of the document, which intersects the document conveyance direction of the conveyance unit 33. The line sensor is composed of a plurality of photoelectric conversion elements aligned along the width direction of the document. The reading apparatus 30 described above is a scanner of a sheet feed type.

The control unit 11, the display unit 13, the communication IF 15 and the conveyance unit 16 of the recording apparatus 10, and the control unit 31, the display unit 35, the communication IF 32 and the conveyance unit 33 of the reading apparatus 30 may be referred to as the first control unit 11, the first display unit 13, the first communication IF 15, the first conveyance unit 16, the second control unit 31, the second display unit 35, the second communication IF 32, and the second conveyance unit 33, respectively, for the sake of distinguishing them.

The recording apparatus 10 and the reading apparatus 30 may be interpreted as independent apparatuses. In this case, when the user sets the medium 40 after the recording at the recording apparatus 10 to the conveyance unit 33 of the reading apparatus 30, the medium 40 after the recording is read by the reading unit 34.

Alternatively, the recording apparatus 10 and the reading apparatus 30 may be integrally configured. Specifically, the recording/reading system 1 may be a single apparatus including the recording apparatus 10 and the reading apparatus 30. In this case, the medium 40 after the recording at the recording unit 17 is continuously conveyed to the reading unit 34 and read by the reading unit 34. That is, the reading unit 34 may be disposed downstream of the recording unit 17 in the conveyance direction in an inline manner.

In the case where the recording apparatus 10 and the reading apparatus 30 are an integrally configured apparatus, the conveyance unit 16 and the conveyance unit 33 are substantially an integrated conveyance means, and they are not necessarily required to be distinguished for understanding the embodiment. Likewise, the control unit 31 may be interpreted as a part of the control unit 11, and the display unit 13 and the display unit 35 may be interpreted as the same component.

The following description will be continued without making any particular distinction as to whether the recording apparatus 10 and the reading apparatus 30 are apparatuses independent of each other, or are an integrated apparatus.

2. Description of Recording Head and Overlapping Region

Next, features of the recording head 20 and recording of an overlapping region using the recording head 20 in the embodiment are described as first to fourth examples.

First Example

Figure 2:
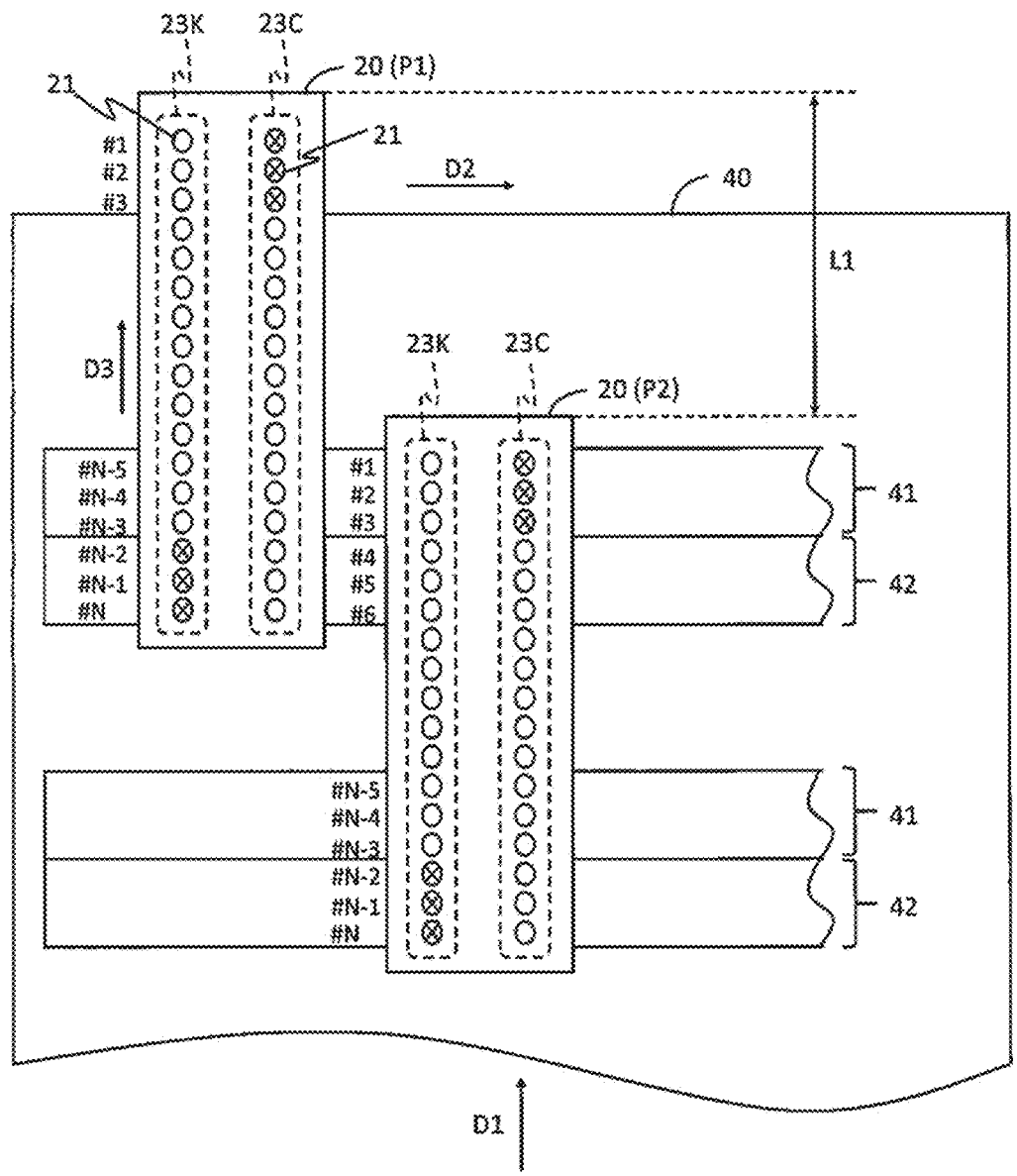
FIG. 2 is a diagram schematically illustrating a relationship between a recording head and a medium and the like according to a first example as viewed from above.

FIG. 2 is a diagram schematically illustrating a relationship between the recording head 20 and the medium 40 and the like according to the first example as viewed from above. In FIG. 2, the recording head 20 is mounted in a carriage omitted in the illustration. That is, the recording unit 17 includes the recording head 20 and the carriage. Alternatively, the recording head 20 may be interpreted as a configuration including the function of the carriage. The carriage is a mechanism that can move back and forth along a main scanning direction D2 intersecting the conveyance direction D1 of the medium 40 of the conveyance unit 16 by receiving the power of the motor. Thus, with the carriage, the recording head 20 performs a forward movement and a backward movement along the main scanning direction D2. The intersection of the conveyance direction D1 and the main scanning direction D2 may be interpreted as orthogonal. Note that orthogonality is not limited to strict orthogonality, but may be an intersection including errors that may occur in the product.

FIG. 2 illustrates an arrangement of the nozzle 21 in the surface of the recording head 20 facing the medium 40. In FIGS. 2 to 5, the circle represents each nozzle 21. In a configuration in which ink of each color is supplied from a liquid holding means called ink cartridge, ink tank and the like not illustrated in the drawing and ejected from the nozzle 21, the recording head 20 includes nozzle rows for respective ink colors. FIG. 2 illustrates a nozzle row 23K for ejecting black (K) ink and a nozzle row 23C for ejecting cyan (C) ink. The nozzle row composed of the plurality of nozzles 21 that eject the K ink is the nozzle row 23K, and the nozzle row composed of the plurality of nozzles 21 that eject the C ink is the nozzle row 23C.

Each nozzle row is composed of the plurality of nozzles 21 arranged at a constant or substantially constant interval (nozzle pitch) between the nozzles 21 in the conveyance direction D1. The direction in which the plurality of nozzles 21 making up the nozzle row are arranged is referred to as a nozzle arrangement direction D3. While an example in which the nozzle arrangement direction D3 obliquely intersects the conveyance direction D1 is known as a configuration of the recording head 20, FIG. 2 illustrates an example in which the nozzle arrangement direction D3 and the conveyance direction D1 are parallel to each other. In FIG. 2, a plurality of nozzle rows are arranged along the main scanning direction D2 at the same position in the conveyance direction D1. Here, the nozzle row 23K is "first nozzle row", and the nozzle row 23C is "second nozzle row". The recording head 20 may naturally include nozzle rows other than the nozzle rows 23K and 23C although they are omitted for reasons of space limitation in the drawing. The recording head 20 may include a nozzle row for ejecting magenta (M) ink, a nozzle row for ejecting yellow (Y) ink, nozzle rows for ejecting other ink and/or liquid other than ink, and the like, for example.

In FIG. 2, the nozzle number is provided to each nozzle 21 making up the nozzle row for the sake of description. More specifically, the N nozzles making up one nozzle row are sequentially provided with nozzle numbers, #1, #2, #3 . . . #N, from the downstream side to the upstream side in the conveyance direction D1. In the first example, the positions of the plurality of nozzle rows in the conveyance direction D1 are the same, and therefore the nozzle number is information common to each nozzle row.

In the first example, the control unit 11 two-dimensionally records an image on the medium 40 based on image data representing an image through a combination of so-called "sheet advancing", which is conveyance of the medium 40 from the upstream side to the downstream side in the conveyance direction D1 using the conveyance unit 16, and "scan", which is ink ejection from the recording head 20 in conjunction with the forward movement and the backward movement of the recording head 20. In this manner, the recording apparatus 10 functions as so-called serial printer. The scan is also referred to as "path". During execution of the scan, the medium 40 is stationary. In FIG. 2, two recording heads 20 are illustrated at two locations. Specifically, the recording head 20 executing a certain one path P1 and the recording head 20 executing the next path P2 after the path P1 are illustrated. A distance L1 between the recording head 20 executing the path P1 and the recording head 20 executing the path P2 in the conveyance direction D1 corresponds to the distance of one sheet advancing.

In FIG. 2, the recording head 20 appears to move upstream in the conveyance direction D1 as the number of paths increases, but in practice, the medium 40 moves downstream in the conveyance direction D1 for each sheet advancing and the relative position of the recording head 20 and the medium 40 changes in the conveyance direction D1. When a certain path is referred to as preceding path, the next path after that certain path is referred to as succeeding path. The path P1 and the path P2 are in the preceding path-succeeding path relationship. Naturally, for the next path after the path P2, the path P2 is a preceding path. In this manner, the path and the sheet advancing are repeated.

In the first example, the line recorded on the medium 40 with the main scanning direction D2 as the longitudinal direction is referred to as "raster line". In the state of image data, the raster line is a pixel line of a plurality of pixels aligned in the main scanning direction D2. In addition, on the medium 40, the raster line is a dot line directed in the main scanning direction D2. It should be noted that the length of the raster line is not limited.

When attention is focused on recording with ink of one color, one raster line can be recorded through ink ejection from one nozzle 21, i.e., a single scan, but the control unit 11 records some raster lines through a plurality of nozzles 21, i.e., multiple scans. The method of recording the raster line with the plurality of nozzles 21 for the ink of one color is referred to as overlapping (hereinafter referred to as OL) recording.

As can be seen from FIG. 2, in the first example, the control unit 11 performs the OL recording in an overlapping manner on a part of the region recorded in the preceding path in the succeeding path by adjusting the distance L1. More specifically, in FIG. 2, the sheet advancing is performed such that recording can be performed in the common regions 41 and 42 of the medium 40 with the nozzle range of the nozzle numbers #N-5 to #N of the recording head 20 in the preceding path and the nozzle range of the nozzle numbers #1 to #6 of the recording head 20 in the succeeding path. The nozzle range of the nozzle numbers #1 to #6 on the downstream side and the nozzle range of the nozzle numbers #N-5 to #N on the upstream side in the conveyance direction D1 used for the OL recording are referred to as downstream nozzle range and upstream nozzle range, respectively. Naturally, the number of nozzles in the downstream nozzle range and the upstream nozzle range are not limited.

In addition, in the first example, some nozzles 21 in the upstream nozzle range of the nozzle row 23K, or more specifically the nozzles 21 of the nozzle numbers #N-2 to #N are unused nozzles, and some nozzles 21 in the downstream nozzle range of the nozzle row 23C, or more specifically the nozzles 21 of the nozzle numbers #1 to #3 are unused nozzles. The unused nozzle is the nozzle 21 that is not used for the recording, and FIG. 2 illustrates the unused nozzle with x in the circle representing the nozzle 21. The nozzle 21 that is not the unused nozzle ejects ink under the control of the control unit 11.

In such a configuration, attention is focused on ejection of the K ink from the nozzle row 23K. A region 41 corresponds to "first overlapping region" where each raster line is formed through two scans of the nozzle row 23K. For example, a certain one raster line making up the first overlapping region 41 is OL-recorded by a first nozzle 21 of the nozzle number #N-5 of the nozzle row 23K in the path P1 and the nozzle 21 of the nozzle number #1 of the nozzle row 23K in the path P2. The region other than the region 41 in the medium 40 corresponds to "first normal region" where each raster line is formed through a single scan of the nozzle row 23K.

Likewise, attention is focused on ejection of the C ink of the nozzle row 23C. A region 42 corresponds to "second overlapping region" where each raster line is formed through two scans of the nozzle row 23C. For example, a certain one raster line making up the second overlapping region 42 is OL-recorded by the nozzle 21 of the nozzle number #N-2 of the nozzle row 23C in the path P1 and the nozzle 21 of the nozzle number #4 of the nozzle row 23C in the path P2. The region other than the region 42 in the medium 40 corresponds to "second normal region" where each raster line is formed through a single scan of the nozzle row 23C.

That is, the first overlapping region 41 overlaps a part of the second normal region and the second overlapping region 42 overlaps a part of the first normal region.

In this manner, in the first example, by setting some nozzles 21 in the first nozzle row to the unused nozzles in one of the upstream nozzle range and the downstream nozzle range and setting some nozzles 21 of the second nozzle row to unused nozzles in the other of the upstream nozzle range and the downstream nozzle range, the first overlapping region 41 OL-recorded by the first nozzle row and the second overlapping region 42 OL-recorded by the second nozzle row are shifted in the conveyance direction D1. In other words, the first overlapping region 41 is formed at a position overlapping the second normal region as viewed in the longitudinal direction of the raster line. In addition, in other words, the second overlapping region 42 is formed at a position overlapping the first normal region as viewed in the longitudinal direction.

Second Example

Figure 3:
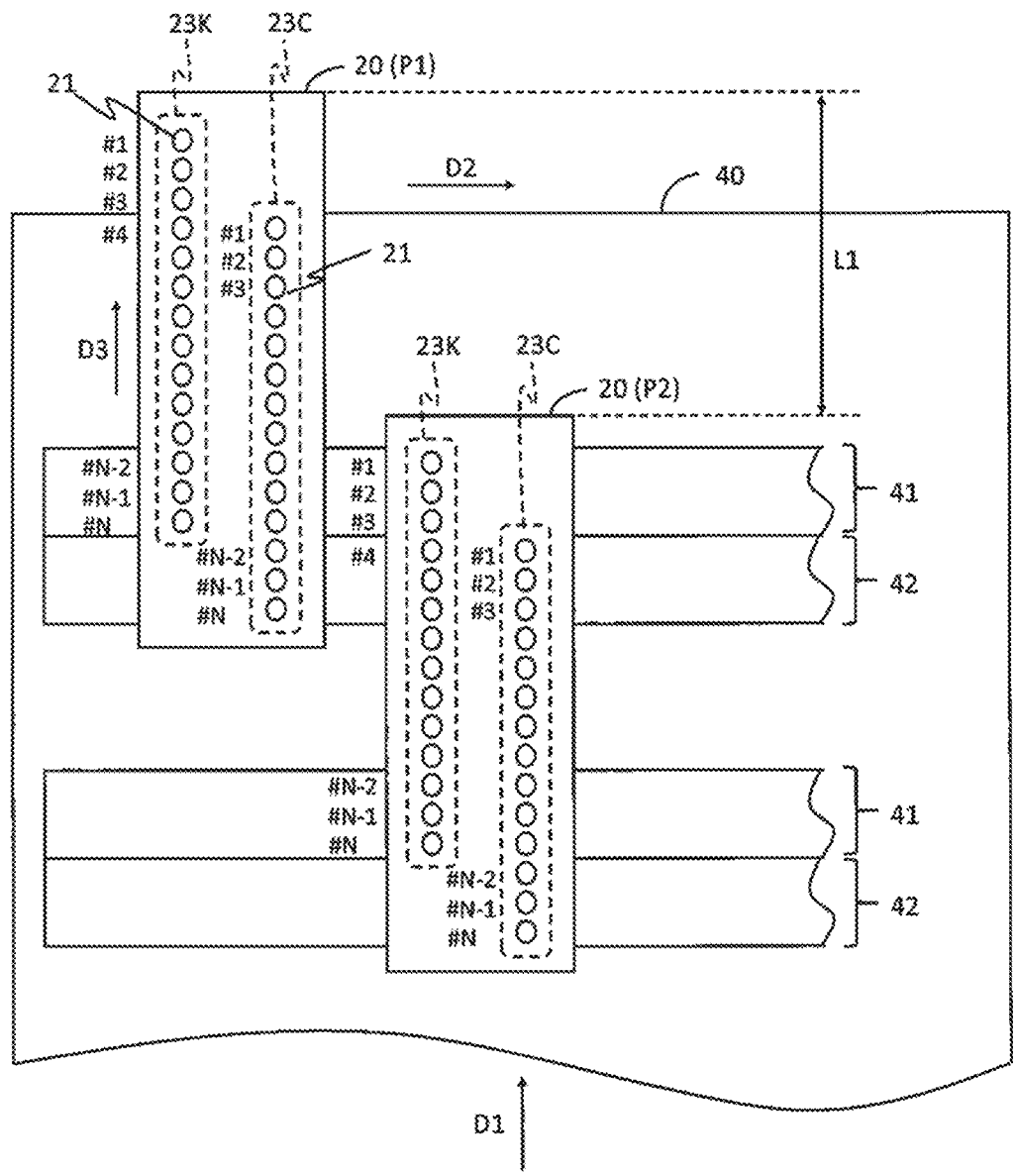
FIG. 3 is a diagram schematically illustrating a relationship between the recording head and the medium and the like according to a second example as viewed from above.

FIG. 3 is a diagram schematically illustrating a relationship between the recording head 20 and the medium 40 and the like according to a second example as viewed from above. The view of FIG. 3 is the same as FIG. 2. As in the first example, in the second example, the recording apparatus 10 is a serial printer. In the second example, description common to the first example is omitted. In the second example, the positions of a plurality of nozzle rows 23K and 23C provided in the recording head 20 are shifted from each other in the conveyance direction D1. In FIG. 3, the position of the nozzle 21 of the nozzle number #4 of the nozzle row 23K and the position of the nozzle 21 of the nozzle number #1 of the nozzle row 23C coincide with each other in the conveyance direction D1. That is, in the second example, the nozzle row 23K and the nozzle row 23C are attached by being shifted by three nozzles in the conveyance direction D1.

It can be said that the nozzle rows 23K and 23C illustrated in FIG. 3 have a configuration obtained by only removing the unused nozzles from the nozzle rows 23K and 23C illustrated in FIG. 2. As such, the number N of nozzles per nozzle row of the nozzle rows 23K and 23C illustrated in FIG. 3 is smaller than the number N of nozzles of FIG. 2 by three. Thus, by using the recording head 20 of FIG. 3 instead of the recording head 20 of FIG. 2, the first overlapping region 41 and the first normal region can be recorded on the medium 40 by the nozzle row 23K, and the second overlapping region 42 and the second normal region can be recorded on the medium 40 by the nozzle row 23C as in first example. That is, the first overlapping region 41 OL-recorded by the first nozzle row and the second overlapping region 42 OL-recorded by the second nozzle row are recorded in a shifted manner in the conveyance direction D1.

More specifically, in FIG. 3, the nozzle range of the nozzle numbers #1 to #3 on the downstream side and the nozzle range of the nozzle numbers #N-2 to #N on the upstream side in the conveyance direction D1 used for the OL recording are set to the downstream nozzle range and the upstream nozzle range, respectively. Then, when attention is focused on ejection of the K ink of the nozzle row 23K, a certain one raster line making up the first overlapping region 41 is OL-recorded by the nozzle 21 of the nozzle number #N-2 of the nozzle row 23K in the path P1 and the nozzle 21 of the nozzle number #1 of the nozzle row 23K in the path P2. In addition, when attention is focused on ejection of the C ink of the nozzle row 23C, a certain one raster line making up the second overlapping region 42 is OL-recorded by the nozzle 21 of the nozzle number #N-2 of the nozzle row 23C in the path P1 and the nozzle 21 of the nozzle number #1 of the nozzle row 23C in the path P2.

Third Example

Figure 4:
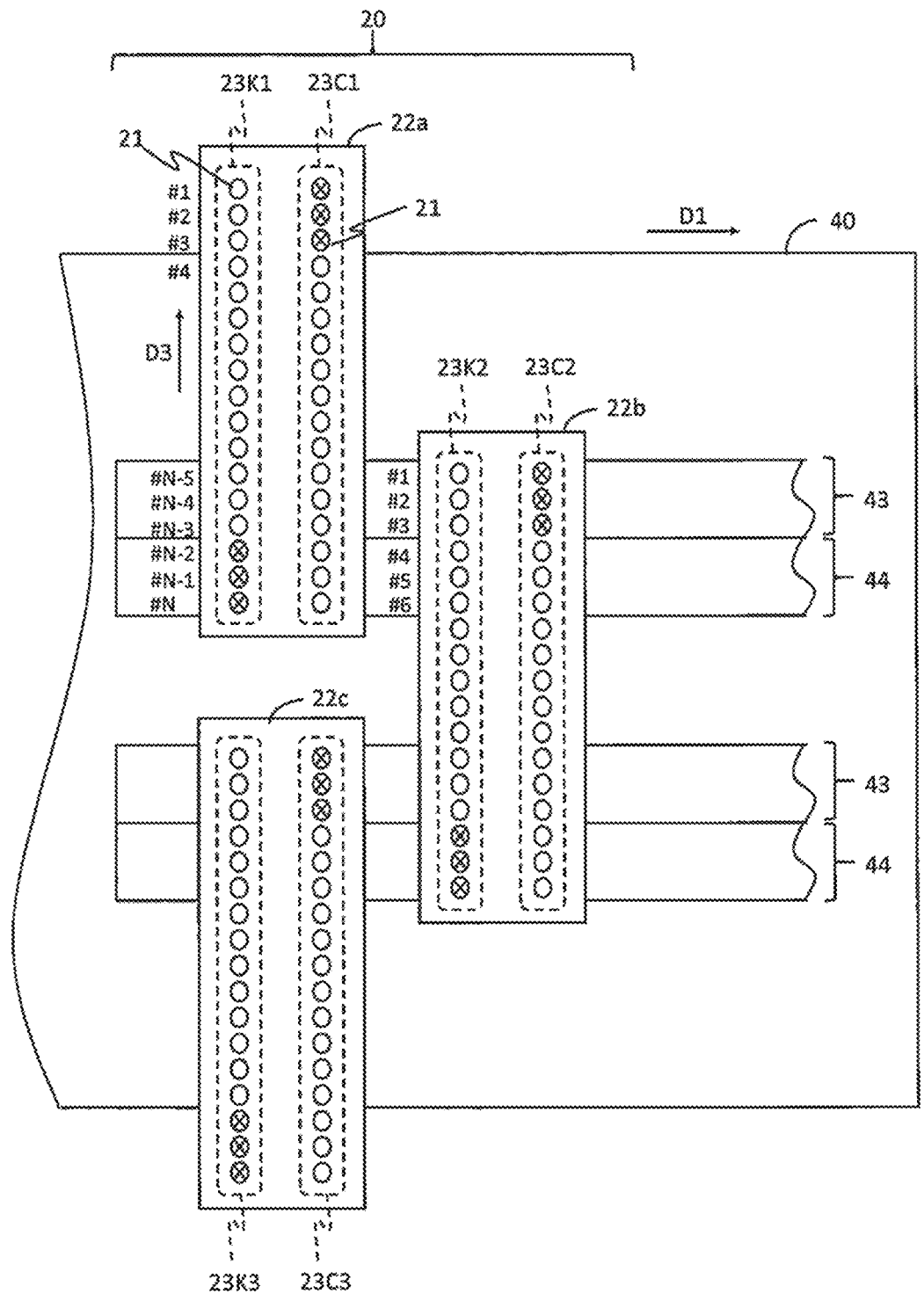
FIG. 4 is a diagram schematically illustrating a relationship between the recording head and the medium and the like according to a third example as viewed from above.

FIG. 4 is a diagram schematically illustrating a relationship between the recording head 20 and the medium 40 and the like according to a third example as viewed from above. While the recording apparatus 10 is assumed to be a serial printer in the first example and the second example, the recording apparatus 10 is assumed to be a so-called line printer in the third example and the fourth example described later. In the third example, description common to the first example with reference to with reference to FIG. 2 is appropriately omitted.

In the third example, the recording unit 17 does not include a carriage, and the recording head 20 does not move. The recording head 20 is composed of a plurality of head chips 22a, 22b and 22c coupled along the nozzle arrangement direction D3. In addition, in the third example, the conveyance direction D1 of the medium 40 of the conveyance unit 16 intersects the nozzle arrangement direction D3. Here, the intersection may also be interpreted as orthogonal or substantially orthogonal. Specifically, the recording head 20 is configured such that the length of the recording head 20 in the nozzle arrangement direction D3 can cover the width of the medium 40 in the nozzle arrangement direction D3.

Naturally, the number of head chips making up the recording head 20 may be greater than three illustrated in FIG. 4. Each of the head chips 22a, 22b and 22c includes a plurality of nozzle rows as with the recording head 20 illustrated in FIG. 2. The nozzle rows 23K and 23C provided in the head chip 22a are referred to as nozzle rows 23K1 and 23C1. Likewise, the nozzle rows 23K and 23C provided in the head chip 22b are referred to as nozzle rows 23K2 and 23C2, and the nozzle rows 23K and 23C provided in head chip 22c are referred to as nozzle rows 23K3 and 23C3. In FIG. 4, the plurality of nozzle rows in the head chip are arranged along the conveyance direction D1, and their positions in the nozzle arrangement direction D3 are the same.

In FIG. 4, nozzle numbers are provided to the nozzles 21 making up the nozzle row in the head chip. N nozzles making up one nozzle row in the head chip are sequentially provided with nozzle numbers #1, #2, #3 . . . #N from one end to the other end in the nozzle arrangement direction D3. In the third example, the positions of the plurality of nozzle rows in the head chip in the nozzle arrangement direction D3 coincide with each other, and therefore the nozzle number in the head chip is information common to each nozzle row.

In the third example, the control unit 11 two-dimensionally records an image on the medium 40 based on image data representing an image by executing in parallel the conveyance of the medium 40 by the conveyance unit 16 at a constant speed from the upstream side to the downstream side in the conveyance direction D1, and the ink ejection from the recording head 20. In addition, in the third example, the line recorded on the medium 40 with the conveyance direction D1 as the longitudinal direction is referred to as "raster line". Specifically, in the state of image data, the raster line is a pixel line of a plurality of pixels aligned in the conveyance direction D1, while it is a dot line directed in the conveyance direction D1 on the medium 40. The length of the raster line is not limited.

In the third example, the control unit 11 also performs the OL recording for some raster lines by using the plurality of nozzles 21. While a part of the region recorded in the preceding path is OL-recorded in the succeeding path in an overlapping manner by adjusting the distance L1 in the first example and the second example, the head chips partially overlap in the nozzle arrangement direction D3 in the configuration of the recording head 20 in the third example. More specifically, in FIG. 4, the nozzle range of the nozzle numbers #N-5 to #N of the head chip 22a and the nozzle range of the nozzle numbers #1 to #6 of the head chip 22b overlap each other. Likewise, the nozzle ranges overlap each other also in the relationship between the head chip 22b and the head chip 22c.

Regarding such a head chip, the nozzle range of the nozzle numbers #1 to #6 on one end side in the nozzle arrangement direction D3 and the nozzle range of the nozzle numbers #N-5 to #N on the other end side in the nozzle arrangement direction D3 may be regarded as with the downstream nozzle range and the upstream nozzle range of the first example, including the presence of the unused nozzle in respective ranges.

In such a configuration, attention is focused on ejection of the K ink by the group of the nozzle rows 23K1, 23K2 and 23K3 of the head chips 22a, 22b and 22c. A region 43 corresponds to "first overlapping region" where each raster line is formed through the ink ejection by the nozzle row 23K1 and the nozzle row 23K2 or the ink ejection by the nozzle row 23K2 and the nozzle row 23K3. For example, a certain one raster line making up the first overlapping region 43 is OL-recorded by the nozzles 21 of the nozzle number #N-5 of the nozzle row 23K1 and the nozzle 21 of the nozzle number #1 of the nozzle row 23K2. The region other than the region 43 in the medium 40 corresponds to "first normal region" where the raster line is formed by the nozzle 21 of any one of the nozzle row 23K1, the nozzle row 23K2 and the nozzle row 23K3.

Attention is focused on ejection of the C ink by the group of the nozzle rows 23C1, 23C2 and 23C3 of the head chips 22a, 22b and 22c. A region 44 corresponds to "second overlapping region" where each raster line is formed through the ink ejection by the nozzle row 23C1 and the nozzle row 23C2 or the ink ejection by the nozzle row 23C2 and the nozzle row 23C3. For example, a certain one raster line making up second overlapping region 44 is OL-recorded by the nozzle 21 of the nozzle number #N-2 of the nozzle row 23C1 and the nozzle 21 of the nozzle number #4 of the nozzle row 23C2. The region other than the region 44 in the medium 40 corresponds to "second normal region" where the raster line is formed by the nozzle 21 of any one of the nozzle row 23C1, the nozzle row 23C2 and the nozzle row 23C3. That is, the first overlapping region 43 overlaps a part of the second normal region, and the second overlapping region 44 overlaps a part of the first normal region.

In the third example, attention is focused on a pair of head chips whose ranges partially overlap each other, and the nozzle row 23K1 is referred to as "first nozzle row", the nozzle row 23K2 is referred to as "second nozzle row", the nozzle row 23C1 is referred to as "third nozzle row", and the nozzle row 23C2 is referred to as "fourth nozzle row", for example Naturally, the nozzle row 23K2 may be regarded as "first nozzle row", the nozzle row 23K3 may be regarded as "second nozzle row", the nozzle row 23C2 may be regarded as "third nozzle row", and the nozzle row 23C3 may be regarded as "fourth nozzle row". In such a third example, the first normal region where the raster line is formed by using the first nozzle row or the second nozzle row, the first overlapping region 43 where the raster line is formed by using the first nozzle row and the second nozzle row, the second normal region where the raster line is formed by using the third nozzle row or the fourth nozzle row, and the second overlapping region 44 where the raster line is formed by using the third nozzle row and the fourth nozzle row, are recorded. Further, the first overlapping region 43 and the second overlapping region 44 are shifted in the nozzle arrangement direction D3. In other words, the first overlapping region 43 is formed at a position overlapping the second normal region as viewed in the longitudinal direction of the raster line. In addition, in other words, the second overlapping region 44 is formed at a position overlapping the first normal region as viewed in the longitudinal direction.

Fourth Example

Figure 5:
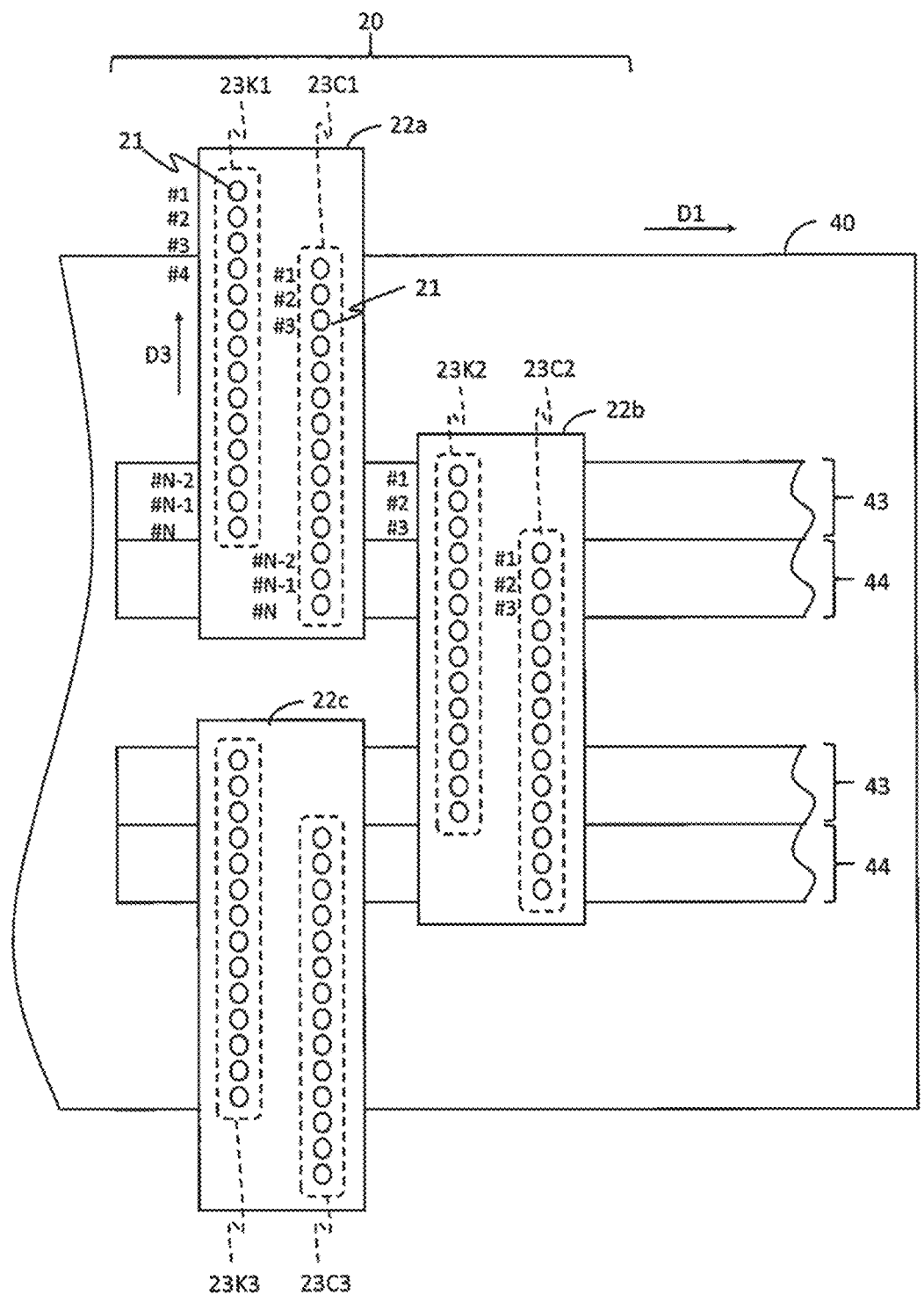
FIG. 5 is a diagram schematically illustrating a relationship between the recording head and the medium and the like according to a fourth example as viewed from above.

FIG. 5 is a diagram schematically illustrating a relationship between the recording head 20 and the medium 40 and the like according to a fourth example as viewed from above. The view of FIG. 5 is the same as FIG. 4. In the fourth example, as in the third example, the recording apparatus 10 is a line printer. In the fourth example, description common to the third example is omitted. The relationship between the third example and the fourth example may be interpreted as being the same as the relationship between the first example and the second example.

That is, in the fourth example, in each of the plurality of the head chips 22a, 22b and 22c provided in the recording head 20, at the positions of the plurality of nozzle rows are shifted from each other in the nozzle arrangement direction D3. The shift amount of the nozzle row 23K1 and the nozzle row 23C1, the shift amount of the nozzle row 23K2 and the nozzle row 23C2, and the shift amount of the nozzle row 23K3 and the nozzle row 23C3 are the same as the shift amount of the nozzle row 23K and the nozzle row 23C of FIG. 3.

It can be said that each of the nozzle rows 23K1, 23C1, 23K2, 23C2, 23K3 and 23C3 illustrated in FIG. 5 has a configuration obtained by only removing the unused nozzles from each of the nozzle rows 23K1 and 23C1, 23K2, 23C2, 23K3 and 23C3 illustrated in FIG. 4. As such, in FIG. 5, the number N of nozzles per nozzle row in the head chip is smaller than the number N of nozzles of FIG. 4 by three. Thus, by using the recording head 20 of FIG. 5 instead of the recording head 20 of FIG. 4, the first overlapping region 43 can be OL-recorded by the first nozzle row and the second nozzle row, the first normal region can be recorded by the first nozzle row or the second nozzle row, the second overlapping region 44 can be OL-recorded by the third nozzle row and the fourth nozzle row, and the second normal region can be recorded by the third nozzle row or the fourth nozzle row, as in the third example. That is, the first overlapping region 43 and the second overlapping region 44 are recorded in a shifted manner in the nozzle arrangement direction D3.

Specifically, in FIG. 5, when attention is focused on ejection of the K ink by the nozzle row 23K1 and the nozzle row 23K2, a certain one raster line making up the first overlapping region 43 is OL-recorded by the nozzle 21 of the nozzle number #N-2 of the nozzle row 23K1 and the nozzle 21 of the nozzle number #1 of the nozzle row 23K2. In addition, when attention is focused on ejection of the C ink by the nozzle row 23C1 and the nozzle row 23C2, a certain one raster line making up the second overlapping region 44 is OL-recorded by the nozzle 21 of the nozzle number #N-2 of the nozzle row 23C1 and the nozzle 21 of the nozzle number #1 of the nozzle row 23C2.

3. Description of Recording of Pattern and Detection of Foreign Matter

Figure 6:
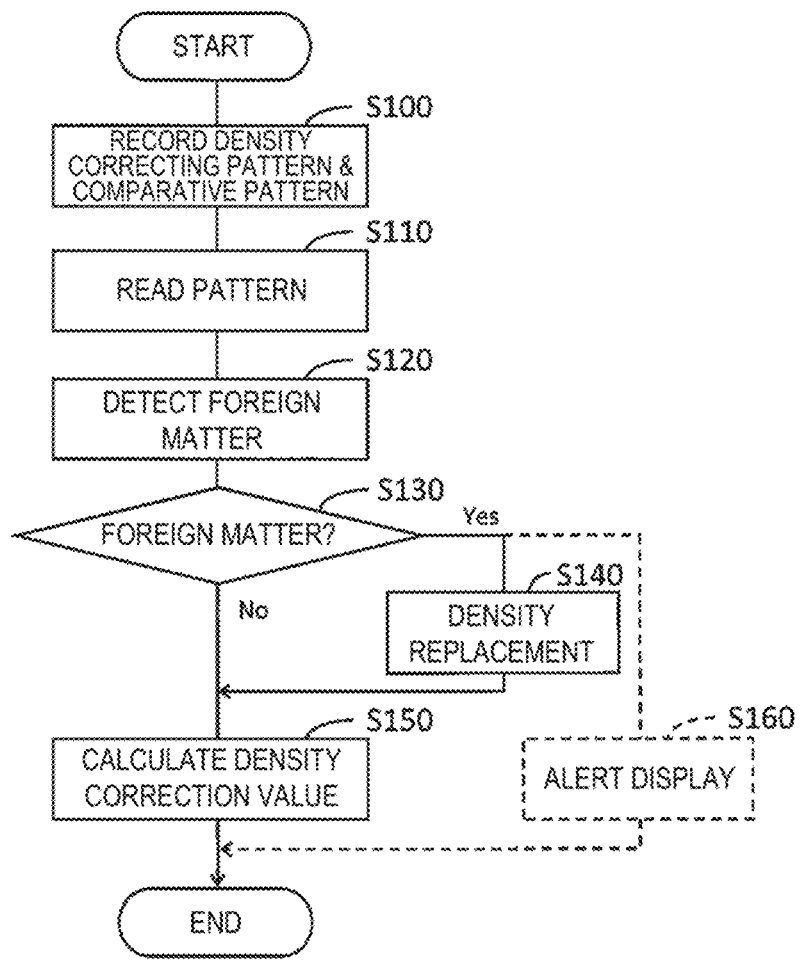
FIG. 6 is a flow flowchart illustrating recording of a pattern and detection of foreign matter.

FIG. 6 is a flow flowchart illustrating recording of a pattern and detection of foreign matter executed by the recording/reading system 1. Note that even in the case where the recording apparatus 10 and the reading apparatus 30 making up the recording/reading system 1 are separate apparatuses, FIG. 6 simply collectively illustrates the processes executed by the apparatuses 10 and 30 in one flowchart.

At step S100, the record control unit 12a of the control unit 11 controls the recording unit 17 and the conveyance unit 16 on the basis of pattern recording image data stored in advance in the storage unit 18 and the like, and records "density correcting pattern" and "comparative pattern" on the medium 40. The pattern recording image data is image data representing a density correcting pattern and a comparative pattern. The density correcting pattern corresponds to "first pattern" including the first overlapping region and the first normal region, and the comparative pattern corresponds to "second pattern" including the second overlapping region and the second normal region. Step S100 is "pattern recording step" of recording a pattern on the medium 40. The comparative pattern is used for detecting foreign matter in the reading unit 34 as described later.

In the embodiment, any of the above-described first to fourth examples may be employed as the specific example of the recording head 20, the conveyance and the like. Specifically, in a configuration in which the recording apparatus 10 employs the first example or the second example, at step S100, the record control unit 12a records the density correcting pattern on the medium 40 by controlling the first nozzle row, and records a comparative pattern on the medium 40 by controlling the second nozzle row. The density correcting pattern includes the first overlapping region, which is the overlapping region where the raster line having a longitudinal direction corresponding to the main scanning direction D2 is formed through m scans, and the first normal region, which is a normal region where the raster line is formed through n scans, and n is smaller than m. The comparative pattern includes the second overlapping region, which is the overlapping region, and the second normal region, which is the normal region. According to the description made above, m=2 and n=1 hold.

Alternatively, in a configuration in which the recording apparatus 10 employs the third example or the fourth example, at step S100, the record control unit 12a records the density correcting pattern on the medium 40 by controlling the first nozzle row and the second nozzle row, and records the comparative pattern on the medium 40 by controlling the third nozzle row and the fourth nozzle row. The density correcting pattern includes the first normal region where the raster line whose longitudinal direction is the conveyance direction D1 intersecting the nozzle arrangement direction D3 is formed by using the first nozzle row or the second nozzle row, and the first overlapping region where the raster line is formed by using the first nozzle row and the second nozzle row. The comparative pattern includes the second normal region where the raster line is formed by using the third nozzle row or the fourth nozzle row and the second overlapping region where the raster line is formed by using the third nozzle row and the fourth nozzle row.

At step S100, in the medium 40, the first overlapping region in the density correcting pattern is formed at a position overlapping the second normal region in the comparative pattern as viewed in the longitudinal direction of the raster line.

At step 110, the control unit 31 controls the conveyance unit 33 and the reading unit 34 to cause the reading unit 34 to read the density correcting pattern and the comparative pattern recorded on the medium 40 at step S100.

Figure 7:
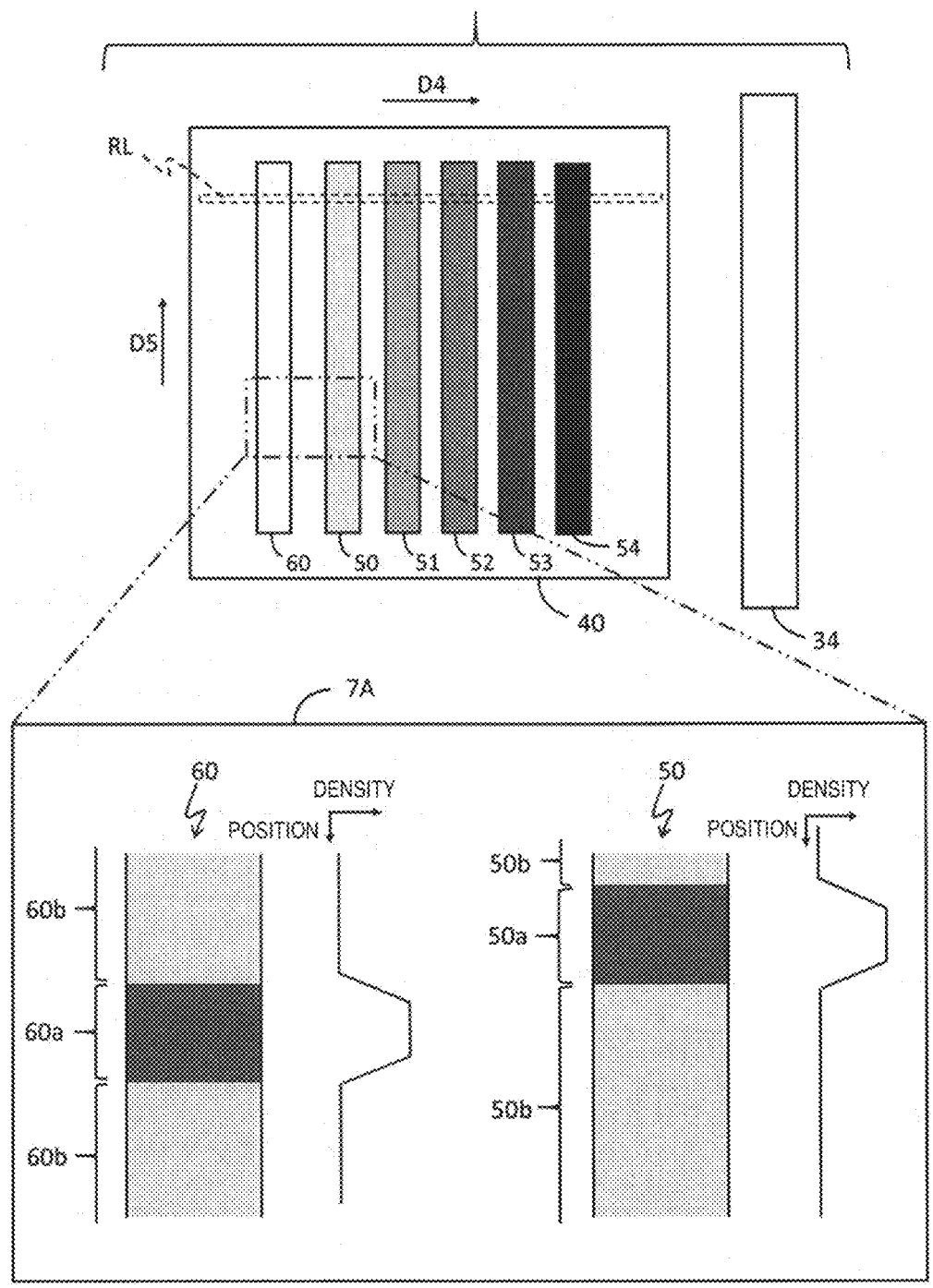
FIG. 7 is a diagram schematically illustrating a medium and a reading unit after pattern recording as viewed from above.

FIG. 7 is a diagram schematically illustrating the medium 40 and the reading unit 34 after pattern recording at step S100 as viewed from above. In FIG. 7, a plurality of density correcting patterns 50, 51, 52, 53 and 54 and a comparative pattern 60 are recorded on the medium 40 along a direction D4. The patterns 50, 51, 52, 53, 54 and 60 do not overlap each other in the direction D4. As can be seen from the example described above, the density correcting patterns 50, 51, 52, 53 and 54 are recorded with the K ink and the comparative pattern 60 is recorded with the C ink. The direction D4 is the longitudinal direction of the raster line, and, in the situation of FIG. 7, the direction D4 is also a conveyance direction for conveying the medium 40 toward the reading unit 34. Note that in a configuration in which the third example or the fourth example is employed as the configuration of the recording head 20 and the reading unit 34 is assembled downstream of the recording head 20 in the conveyance direction D1, the conveyance direction D1=D4 can be interpreted to hold. On the other hand, in a configuration in which the first example or the second example is employed as the configuration of the recording head 20, it is necessary to automatically or manually convert the orientation of the medium 40 after the recording such that the longitudinal direction of the raster line in the medium 40 after the recording is directed to the direction D4.

The density correcting patterns 50, 51, 52, 53 and 54 are recorded with respective different K densities, and the comparative pattern 60 is recorded with a predetermined C density. The density may be interpreted as the cover rate of dots, the dot generation rate per unit area, and the like. In addition, each of the density correcting patterns 50, 51, 52, 53 and 54 and the comparative pattern 60 is a belt-shaped pattern whose longitudinal direction is a direction D5 intersecting the direction D4, and each pattern has a constant density. Here, the constant density means that the density represented by the pattern recording image data has a constant value in each pattern, and density variation, i.e., unevenness in density, is generated in each pattern actually recorded on the medium 40 due to the non-uniformity of the ejection characteristics and the like of the nozzles 21.

In a situation where the recording head 20 performs recording on the medium 40, the direction D5 for the medium 40 corresponds to the nozzle arrangement direction D3. In FIG. 7, the density correcting patterns 50, 51, 52, 53 and 54 are darker in sequence. Each pattern is recorded at the density (constant value) set in the image data such that the density correcting pattern 50 is at 20%, the density correcting pattern 51 is at 40%, the density correcting pattern 52 is at 60%, the density correcting pattern 53 is at 80%, and the density correcting pattern 54 is at 100%, for example. When one raster line RL with the maximum length in the direction D4 as indicated with the broken line in FIG. 7 is assumed to be provided in the medium 40 after the pattern recording described above, the raster line RL includes a part of each of the density correcting patterns 50, 51, 52, 53 and 54 and the comparative pattern 60.

As illustrated in FIG. 7, the longitudinal direction of the reading unit 34 is the direction D5. That is, the line sensor provided in the reading unit 34 is arranged with the direction D5 as the longitudinal direction. Thus, when the medium 40 after pattern recording is conveyed in the direction D4 and the reading unit 34 reads the medium 40, the density of each of the density correcting patterns 50, 51, 52, 53 and 54 and the comparative pattern 60 is obtained for each position of the raster line. Note that here, while the information acquired by the reading unit 34 as the reading result of the medium 40 is the luminance of each pixel and the like, the information acquired by the reading unit 34 as the reading result is also referred to as "density", for example. The density correcting patterns 50, 51, 52, 53 and 54 are patterns for calculating "density correction value" for correcting the non-uniformity of the density at each position of the raster line. Calculation of the density correction value will be described later.

In FIG. 7, a part of the density correcting pattern 50 and the comparative pattern 60 surrounded by the two-dotted line in the medium 40 is illustrated in an enlarged diagram of FIG. 7A. The enlarged diagram of FIG. 7A also illustrates reading results of a part of the density correcting pattern 50 and a part of the comparative pattern 60 at the reading unit 34 in the form of graphs. In the graph, the abscissa indicates the density as the reading result, and the ordinate indicates the position of each raster line. In other words, the position of each raster line is the position of the nozzle 21 in the nozzle arrangement direction D3.

As illustrated in the enlarged diagram of FIG. 7A, the density correcting pattern 50 includes a first overlapping region 50a and a first normal region 50b. In addition, the comparative pattern 60 includes a second overlapping region 60a and a second normal region 60b. How the first overlapping region, the first normal region, the second overlapping region, and the second normal region have been recorded is as described above. While the density correcting pattern 50 is an image recorded at a density of 20% with the K ink and the comparative pattern 60 is an image recorded at a predetermined density with the C ink as described above, the enlarged diagram of FIG. 7A represents the density variation in each of the density correcting pattern 50 and the comparative pattern 60 for the sake of description, and does not necessarily correspond to the colors and densities of the original patterns 50 and 60 of the enlarged source of FIG. 7.

Ideally, the density in the density correcting pattern 50 is constant, but there is a difference in density between the first overlapping region 50a and the first normal region 50b. That is, between the first normal region 50b in which each raster line is recorded by one nozzle 21 and the first overlapping region 50a in which each raster line is OL-recorded by two nozzles 21, the density difference easily occurs at the medium 40 due to the difference in overlapping amount of the dots, the difference in impinging time difference of dots, and the like. In the example illustrated in the enlarged diagram of FIG. 7A, the first overlapping region 50a has a higher density, i.e., higher darkness than the first normal region 50b. Likewise, ideally, the density in the comparative pattern 60 is constant, but there is a density difference between the second overlapping region 60a and the second normal region 60b. In the example illustrated in the enlarged diagram of FIG. 7A, the second overlapping region 60a has a density higher than that of the second normal region 60b.

As is clear from the enlarged diagram of FIG. 7A, the first overlapping region 50a in the density correcting pattern 50 overlaps the second normal region 60b in the comparative pattern 60 as viewed in the longitudinal direction of the raster line, and the position is shifted from the second overlapping region 60a. Note that in each of the overlapping regions 50a and 60a and normal regions 50b and 60b, there is a slight difference in density at each position of the raster line due to the non-uniformity of the ejection characteristics of the nozzle 21 used for the recording of each raster line. It should be noted that, in enlarged in FIG. 7A, expression of such a slight density difference at each position of the raster line is omitted, and the density difference between the first overlapping region 50a and the first normal region 50b and the density difference between the second overlapping region 60a and the second normal region 60b are clearly illustrated.

At step S120, the control unit 31 performs foreign matter detection at the reading unit 34 on the basis of the reading result of the density correcting pattern and the comparative pattern from the reading unit 34. The control unit 31 that executes step S120 corresponds to "detection unit" that executes foreign matter detection. In this case, it suffices that the control unit 31 compares the reading result of the density correcting pattern and the reading result of the comparative pattern, and determines that there is foreign matter when there is a range where the density variation is large at the same position in the results.

Figure 8:
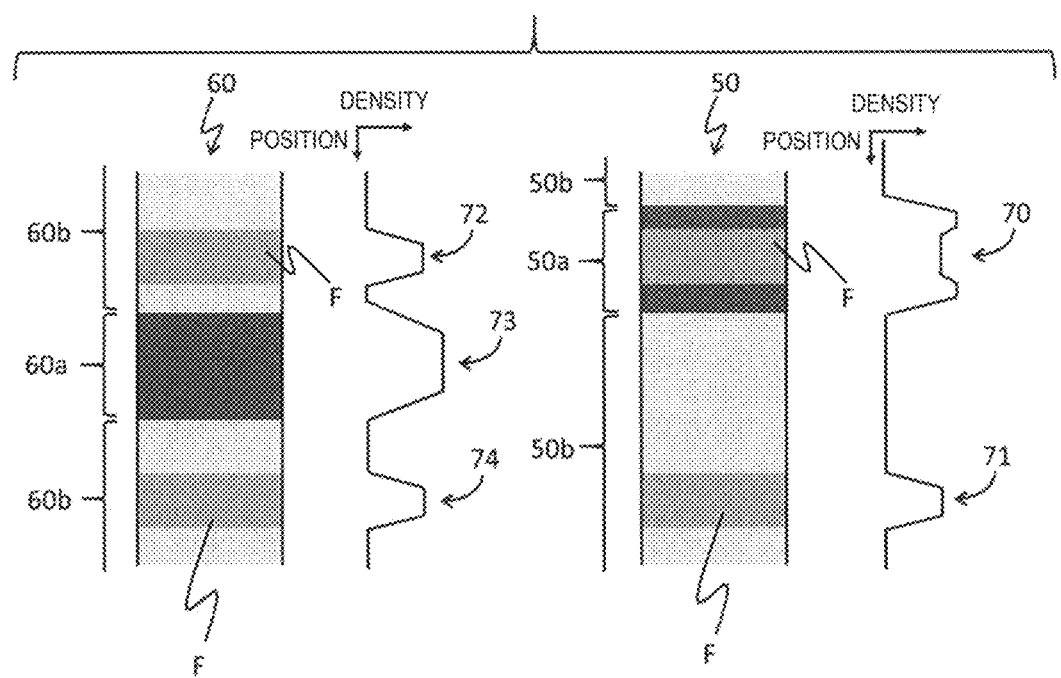
FIG. 8 is a diagram illustrating an example of a part of a density correcting pattern and a comparative pattern and a reading result.

As in the enlarged diagram of FIG. 7A in FIG. 7, FIG. 8 illustrates a part of the density correcting pattern 50, a part of the comparative pattern 60, and their reading results at the reading unit 34. FIG. 8 is different from the enlarged diagram of FIG. 7A in that the density of foreign matter F adhered to the reading unit 34 is indicated in the graph of the reading result. Note that while the foreign matter F adheres to the reading unit 34, a pseudo foreign matter F is illustrated in the density correcting pattern 50 and in the comparative pattern 60 for the reason that the patterns 50 and 60 appear as in FIG. 8 from the reading unit 34.

As described above, there is a density difference between the overlapping region and the normal region in a single pattern. On the other hand, there is also a density difference between the density of the read foreign matter F and the density of the normal region. Therefore, in the case where the reading result of a single pattern, e.g., the density correcting pattern 50 is analyzed and there is a density different from the normal region, it is difficult to determine whether that is the density corresponding to the overlapping region or the density corresponding to the foreign matter F. In particular, in the case where the foreign matter F adheres at the position corresponding to the overlapping region in the reading unit 34, it is difficult to detect the foreign matter F from the reading result of the density correcting pattern 50. In the embodiment, the first overlapping region in the density correcting pattern and the second overlapping region in the comparative pattern are recorded in a shifted manner in the nozzle arrangement direction D3. Thus, when the reading result of the density correcting pattern and the reading result of the comparative pattern are compared with each other and there is a large density variation only in one of the reading result of the density correcting pattern and the reading result of the comparative pattern at a certain position, then it can be determined to be the density variation corresponding to the overlapping region. Conversely, when there is a large density variation in both the reading result of the density correcting pattern and the reading result of the comparative pattern at a certain position, then it can be determined to be the density variation corresponding to the foreign matter F, not the overlapping region.

In FIG. 8, the reference numbers 70 and 71 in the graph as the reading result of the density correcting pattern 50 represent a range where the density is largely changed (hereinafter referred to as density changing range) in comparison with the density of the normal region. The "density is largely changed in comparison with the density of the normal region" means that the absolute value of the difference from the average density of the normal region in the pattern is equal to or greater than a predetermined threshold value, for example. Likewise, in FIG. 8, reference numbers 72, 73 and 74 in the graph as the reading result of the comparative pattern 60 also indicate density changing ranges. One density changing range is shown also in each of the two graphs of the enlarged diagram of FIG. 7A.

The results show that, of the density changing ranges 70 to 74, the density changing ranges 70, 71, 72 and 74 are densities corresponding to the foreign matter F. That is, the density changing ranges 70 and 72 are the results of the density of a certain foreign matter F indicated in both the density of the density correcting pattern 50 and the density of the comparative pattern 60. Likewise, the density changing ranges 71 and 74 are the results of the density of another certain foreign matter F indicated in both the density of the density correcting pattern 50 and the density of the comparative pattern 60. While the foreign matter F includes various matters such as paper dust and ink smudge, and the color and the density differ depending on what exactly it is, FIG. 8 illustrates an example case where the density of the foreign matter F is also high in comparison with the normal region. A density changing range 70 has a density of the foreign matter F overlapping a part of the first overlapping region 50a.

According to FIG. 8, it can be said that the density changing range 70 in the graph as the reading result of the density correcting pattern 50 and the density changing range 72 in the graph as the reading result of the comparative pattern 60 are generated at the same position in the ordinate of the graph. In addition, the density changing range 71 and the density changing range 74 are also generated at the same position. The "same position" may be defined not only as being exact same and completely overlapping, but also as including some errors and margins. In this manner, when the reading result as illustrated in FIG. 8 is obtained, the control unit 31 determines that detection of foreign matter is successful, i.e., there is foreign matter. On the other hand, when the reading result as illustrated in the enlarged diagram of FIG. 7A is obtained, it cannot be said that the positions of the density changing range in the graph as the reading result of the density correcting pattern 50 and the density changing range in the graph as the reading result of the comparative pattern 60 are the same, and accordingly the control unit 31 determines that detection of foreign matter is not successful, i.e., there is no foreign matter.

At step S130, the control unit 31 divides the process in accordance with the result of the detection of the foreign matter at step S120. When determining that there is foreign matter, the control unit 31 advances the process from "Yes" of step S130 to step S140, whereas when determining that there is no foreign matter, the control unit 31 advances the process from "No" of step S130 to step S150.

While the reading result of the density correcting pattern 50 and the reading result of the comparative pattern 60 are compared with each other in FIG. 7 and FIG. 8, the control unit 31 may execute the detection of the foreign matter by comparing the reading result of any of the other density correcting patterns 51, 52, 53 and 54 and the reading result of the comparative pattern 60. Of the density correcting patterns 50, 51, 52, 53 and 54, the control unit 31 may use the reading result of the pattern with the density that tends to indicate the difference from the density of the foreign matter, for the comparison with the reading result of the comparative pattern 60, for example.

4. Description of Calculation and Correction of Density Correction Value

At step S140, the control unit 31 replaces the density at the position corresponding to the detected foreign matter in the reading result of the density correcting pattern with the reading result of the nearby position in the density correcting pattern. As illustrated in FIG. 8 for example, when determining that there is foreign matter in the density changing range 71 in the reading result of the density correcting pattern 50, the control unit 31 replaces the density of the density changing range 71 with the density of the first normal region at a position adjacent to or near the density changing range 71 at step S140. In addition, when determining that there is foreign matter in the density changing range 70 corresponding to the first overlapping region 50a in the reading result of the density correcting pattern 50, the control unit 31 replaces the density of the density changing range 70 with the density of another first overlapping region that does not include the density of the foreign matter at a position near the density changing range 70 at step S140.

The position of the foreign matter detected at step S120 is common to the reading result of the density correcting pattern other than the density correcting pattern that is compared with the comparative pattern 60. Therefore, when the foreign matter has been detected by comparing the density correcting pattern 50 with the comparative pattern 60 as described above, the control unit 31 replaces the density of the position corresponding to the foreign matter with the density of the nearby position in the pattern in the same manner for the reading results of the density correcting patterns 51, 52, 53 and 54 at step S140. Through this step S140, the influence of the foreign matter can be removed from the reading results of the density correcting patterns 50, 51, 52, 53 and 54.

Through "No" of step S130 or step S140, at step S150, the data correction unit 12b of the control unit 11 calculates the density correction value at each position of the raster line. Note that the control unit 31 transfers, to the control unit 11, read image data as the reading results of the density correcting patterns 51, 52, 53 and 54 at the reading unit 34. In the case where step S140 is executed, the read image data transferred to the control unit 11 is naturally data after the process of step S140.

Step S150 is briefly described below. The data correction unit 12b calculates the density correction value for each position of the raster line on the basis of the read image data of the density correcting patterns 50, 51, 52, 53 and 54. Briefly speaking, for a position of a certain one raster line, the data correction unit 12b compares the density as the reading result of certain one density correcting pattern, e.g., the density correcting pattern 50 corresponding to 20% of K with a predetermined reference value (luminance) expected to be obtained as the reading result of the density correcting pattern 50, and calculates the density correction value in accordance with the comparison result. That is, when the density of the density correcting pattern 50 is higher than the reference value, the density correction value for reducing the density (brightening) is calculated. Conversely, when the density of the density correcting pattern 50 is lower than the reference value, the density correction value for increasing the density (darkening) is calculated. The correction value for reducing the density is a correction value that acts to reduce the ink amount, and the correction value for increasing the density is a correction value that acts to increase the ink amount.

The density correction value calculated in this manner is the correction value for correcting the density (20% of K) of the image data of recording source of the density correcting pattern 50 corresponding to the position of the one raster line. The calculation of the density correction value of the above-described procedure is performed for the position of each raster line and for each of the densities (20%, 40%, 60%, 80% and 100% of K) of the recording source of the density correcting patterns 50 to 54. Further, the data correction unit 12b executes interpolation computation of the density correction value as necessary, and as a result, obtains the density correction value for each of the positions of all raster lines and for each of all densities (0 to 100% of K). The data correction unit 12b records the density correction values calculated in this manner in the storage unit 18 and the like, and terminates the flowchart of FIG. 6.

Thereafter, when the control unit 11 executes recording of an image based on image data arbitrarily selected by the user, the data correction unit 12b corrects the density of K of each pixel of the image data with the density correction value corresponding to the density and the position of the raster line. Then, on the basis of the image data corrected in this manner, the record control unit 12a records the image on the medium 40 by controlling the conveyance unit 16 and the recording unit 17. As a result, recording results with favorable image quality in which the non-uniformity of the density of each raster line and the density difference between the overlapping region and the normal region are corrected are obtained.

Through the procedure of the above-described steps S140 and S150 and the subsequent image recording including the correction using the density correction value, the amount of the ink to be thereafter ejected from the nozzle 21 used for the recording of the raster line corresponding to the position where the foreign matter is detected at step S120 is corrected with the density correction value calculated through the calculation of the correction value at step S150 based on the density after the replacement step S140. Thus, it can be said that when foreign matter is detected by the detection unit, the control unit 11 controls the ejection of the liquid at a foreign matter position nozzle, which is the nozzle 21 used for the recording of the region where the foreign matter is detected, on the basis of the reading result of the reading unit 34 corresponding to the nozzle 21 near the foreign matter position nozzle.

Note that the density correction value is required for all colors of the ink ejected by the recording head 20. Therefore, in the case where the recording head 20 includes nozzle rows of CMYK inks, the density correcting patterns of the C, M and Y inks are recorded on the medium 40 as with the density correcting patterns 50 to 54 of the K ink illustrated in FIG. 7 in the embodiment, for example. The method of calculating the density correction value, including the density replacement at step S140, is the same for all ink colors. Therefore, the density correcting pattern of ink other than K may be used for the comparison of the reading result with the reading result of the comparative pattern 60 for the foreign matter detection. In addition, it suffices to record the comparative pattern 60 with the ink of any one color, and therefore the comparative pattern 60 may be recorded with the ink other than the C ink.

5. Modification

When determining that "Yes" at step S130, the control unit 31 may proceed to step S160 as indicated with the broken line in FIG. 6. In this case, steps S140 and S150 are not executed. At step S160, the control unit 31 causes the display unit 35 to display an alert indicating that there is a region where reading by the reading unit 34 has failed, and then terminates the flowchart of FIG. 6. The region where reading by the reading unit 34 has failed is naturally a position where foreign matter has been detected. The display unit 35 displays an alert message, such as "Some parts of the document could not be read due to foreign matter adhering to the image sensor". In addition, the display unit 35 may use an alert display of a message urging the user to remove foreign matter such as "Clean the image sensor as there may be foreign matter adhering to the image sensor" at step S160.

In addition, together with the alert display of step S160, the control unit 31 may inquire the user whether step S140 and S150 can be executed or not, and proceed to step S140 and S150 when the user's instruction is accepted for this execution or not.

6. Conclusion

In this manner, according to the embodiment, the recording apparatus 10 includes a first nozzle row and a second nozzle row including the plurality of nozzles 21 configured to eject liquid to the medium 40, and a control unit 11 configured to control ejection of the liquid by the first nozzle row and the second nozzle row, and the control unit 11 is configured to cause the first nozzle row and the second nozzle row to perform scan of ejecting the liquid while moving forward or backward along the predetermined main scanning direction D2. When the control unit 11 records a first pattern including a first overlapping region and a first normal region on the medium 40 by controlling the first nozzle row and records a second pattern including a second overlapping region and a second normal region on the medium 40 by controlling the second nozzle row, the control unit 11 forms the first overlapping region at a position overlapping the second normal region as viewed in a longitudinal direction, the first overlapping region being an overlapping region where a raster line having a longitudinal direction corresponding to the main scanning direction D2 is formed by performing the scan m times, the first normal region being a normal region where the raster line is formed by performing the scan n times, n being smaller than m, the second overlapping region being the overlapping region, the second normal region being the normal region.

In addition, according to the embodiment, the recording apparatus 10 includes a first nozzle row, a second nozzle row, a third nozzle row and a fourth nozzle row in which the plurality of nozzles 21 configured to eject liquid to the medium 40 are arranged in the arrangement direction D3 of the nozzles, and a control unit 11 configured to control ejection of the liquid by the first nozzle row, the second nozzle row, the third nozzle row and the fourth nozzle row. Further, the control unit 11 records a first pattern including a first normal region and a first overlapping region on the medium 40 by controlling the first nozzle row and the second nozzle row and records a second pattern including a second normal region and a second overlapping region on the medium 40 by controlling the third nozzle row and the fourth nozzle row, the control unit 11 forms the first overlapping region at a position overlapping the second normal region as viewed in a longitudinal direction, the first normal region being a region where a raster line having a longitudinal direction corresponding to a direction intersecting the arrangement direction D3 of the nozzles is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

In each configuration, when the first pattern and the second pattern are recorded on the medium 40, the first overlapping region is formed at a position overlapping the second normal region as viewed in the longitudinal direction of the raster line. Thus, a pattern with which it is easy to determine whether the reason for the part with a large density variation in the reading result is the influence of the overlapping region or the influence of foreign matter at the time of reading is recorded, which is useful for the detection of foreign matter. In addition, since the foreign matter detection is facilitated with the above-mentioned pattern design, it is not necessary to have two image reading sensors for detecting and cleaning foreign matter unlike in known technology, which leads to product cost reduction.

In addition, according to the embodiment, the control unit 11 records a plurality of the first patterns with densities different from each other, along the longitudinal direction.

By recording the plurality of first patterns with densities different from each other, an appropriate density correction value with increased density correction accuracy can be obtained on the basis of the reading result of each first pattern.

It should be noted that, a configuration of recording only one pattern for the first pattern may be employed. For example, in FIG. 7, only the density correcting pattern 52 is recorded on the medium 40 as the first pattern. The control unit may execute the foreign matter detection by comparing the reading result of the density correcting pattern 52 with the reading result of the comparative pattern 60, and may determine the density correction value of each position of the raster line by determining the tendency of the density variation of the record density in each raster line on the basis of the reading result of the density correcting pattern 52.

In addition, according to the embodiment, the first pattern and the second pattern are recorded with liquids of different colors.

With this configuration, the first pattern and the second pattern have different colors on the medium 40, and thus it is easy to determine the density of the first pattern and the density of the second pattern from the reading result of the medium 40, and to detect foreign matter on the basis of the comparison between the first pattern and the second pattern.

It should be noted that, in the case where the recording head 20 includes multiple rows or multiple nozzle row groups that eject the ink of the same color, the first pattern and the second pattern may be recorded with ink of the same color.

In addition, according to the embodiment, the recording/reading system 1 includes the recording apparatus 10, the reading unit 34 configured to read the first pattern and the second pattern recorded on the medium 40 by the recording apparatus 10, and the detection unit (control unit 31) configured to detect foreign matter at the reading unit 34, based on a reading result of the first pattern and the second pattern from the reading unit 34.

With this configuration, the recording/reading system 1 can perform the foreign matter detection at the reading unit 34 on the basis of the reading result of the first pattern and the second pattern from the reading unit 34.

In addition, according to the embodiment, the recording/reading system 1 may include the display unit 35 configured to display information, and when the foreign matter is detected by the detection unit, the display unit 35 may indicate that there is a region where reading by the reading unit 34 failed.

With this configuration, when foreign matter is detected by the detection unit, the user can recognize that there is a region where reading by the reading unit 34 has failed.

In addition, according to the embodiment, when the foreign matter is detected by the detection unit, the control unit 11 may control ejection of the liquid by a foreign matter position nozzle, based on a reading result of the reading unit 34 corresponding to the nozzle 21 located near the foreign matter position nozzle, the foreign matter position nozzle being the nozzle 21 used for recording a region where the foreign matter is detected.

With this configuration, when foreign matter is detected by the detection unit, the subsequent liquid ejection of the nozzle 21 can be appropriately controlled on the basis of the reading result of the reading unit 34 in which the influence of the foreign matter is eliminated.

The embodiment is not limited to apparatuses and systems, and encompasses disclosures of various categories such as a method executed by apparatuses and systems and the program 12 for causing a processor to execute the method.

For example, in a recording method of the recording apparatus 10 configured to perform recording by controlling ejection of liquid by a first nozzle row and a second nozzle row including the plurality of nozzles 21 configured to eject the liquid to the medium 40, the recording method includes a pattern recording step of recording a pattern on the medium 40 by causing the first nozzle row and the second nozzle row to perform scan of ejecting the liquid while moving forward or backward along the predetermined main scanning direction D2. In the pattern recording step, when recording a first pattern including a first overlapping region and a first normal region on the medium 40 by controlling the first nozzle row and recording a second pattern including a second overlapping region and a second normal region on the medium 40 by controlling the second nozzle row, the first overlapping region is formed at a position overlapping the second normal region as viewed in a longitudinal direction, the first overlapping region being an overlapping region where a raster line having a longitudinal direction corresponding to the main scanning direction D2 is formed by performing the scan m times, the first normal region being a normal region where the raster line is formed by performing the scan n times, n being smaller than m, the second overlapping region being the overlapping region, the second normal region being the normal region.

While m=2 and n=1 hold in the description made above, the values of m and n are not limited to these. For example, for the first pattern, the recording apparatus 10 may OL-record each raster line of the first overlapping region through four scans of the first nozzle row and OL-record each raster line of the first normal region through two scans of the first nozzle row. Further, for the second pattern, the recording apparatus 10 may OL-record each raster line of the second overlapping region through four scans of the second nozzle row and OL-record each raster line of the second normal region through two scans of the second nozzle row. That is, it is only necessary that the relationship of m>n holds.

In addition, in a recording method of the recording apparatus 10 configured to perform recording by controlling ejection of liquid by a first nozzle row, a second nozzle row, a third nozzle row and a fourth nozzle row in which the plurality of nozzles 21 configured to eject the liquid to the medium 40 are arranged in the arrangement direction D3 of the nozzles, the recording method includes a pattern recording step of recording a pattern on the medium 40 by causing the first nozzle row, the second nozzle row, the third nozzle row and the fourth nozzle row to eject the liquid. In the pattern recording step, when recording a first pattern including a first normal region and a first overlapping region on the medium 40 by controlling the first nozzle row and the second nozzle row and recording a second pattern including a second normal region and a second overlapping region on the medium 40 by controlling the third nozzle row and the fourth nozzle row, the first overlapping region is formed at a position overlapping the second normal region as viewed in a longitudinal direction, the first normal region being a region where a raster line having a longitudinal direction corresponding to a direction intersecting the arrangement direction D3 of the nozzles is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

What is claimed is:

1. A recording/reading system comprising:
    a first nozzle row and a second nozzle row including a plurality of nozzles configured to eject liquid to a medium; and
    a control unit configured to control ejection of the liquid by the first nozzle row and the second nozzle row to record a first pattern and a second pattern on the medium, respectively, the first pattern including a first overlapping region and a first normal region, the second pattern including a second overlapping region and a second normal region;
    a reading unit configured to read the first pattern and the second pattern recorded on the medium; and
    a detection unit configured to detect foreign matter at the reading unit by comparing positions of density changes in the first pattern and the second pattern, based on a reading result of the first pattern and the second pattern from the reading unit, wherein
    the control unit is configured to cause the first nozzle row and the second nozzle row to perform scan of ejecting the liquid while moving forward or backward along a predetermined main scanning direction; and
    the control unit is configured to form the first overlapping region at a position overlapping the second normal region as viewed in a longitudinal direction, the first overlapping region and the second overlapping region each being a region where a raster line having the longitudinal direction corresponding to the main scanning direction is formed by performing the scan m times, the first normal region and the second normal region each being a region where the raster line is formed by performing the scan n times, n being smaller than m.

2. The recording/reading system according to claim 1, wherein
    the control unit records a plurality of the first patterns with densities different from each other, along the longitudinal direction.

3. The recording/reading system according to claim 1, wherein
    the first pattern and the second pattern are recorded with liquids of different colors.

4. The recording/reading system according to claim 1, further comprising:
    a display unit configured to display information, wherein when the foreign matter is detected by the detection unit, the display unit indicates that there is a region where reading by the reading unit failed.

5. The recording/reading system according to claim 1, wherein
    when the foreign matter is detected by the detection unit, the control unit controls ejection of the liquid by a foreign matter position nozzle, based on a reading result of the reading unit corresponding to the nozzle located near the foreign matter position nozzle, the foreign matter position nozzle being the nozzle used for recording a region where the foreign matter is detected.

6. A recording/reading system comprising:
    a first nozzle row, a second nozzle row, a third nozzle row and a fourth nozzle row in which a plurality of nozzles configured to eject liquid to a medium are arranged with respect to each other in a predetermined direction; and
    a control unit configured to control ejection of the liquid by the first nozzle row, the second nozzle row, the third nozzle row and the fourth nozzle row to record a first pattern on the medium by controlling the first nozzle row and the second nozzle row and to record a second pattern on the medium by controlling the third nozzle row and the fourth nozzle row, the first pattern including a first overlapping region and a first normal region, the second pattern including a second overlapping region and a second normal region;
    a reading unit configured to read the first pattern and the second pattern recorded on the medium; and
    a detection unit configured to detect foreign matter at the reading unit by comparing positions of density changes in the first pattern and the second pattern, based on a reading result of the first pattern and the second pattern from the reading unit, wherein
    the control unit is configured to form the first overlapping region at a position overlapping the second normal region as viewed in a longitudinal direction, the first normal region being a region where a raster line having the longitudinal direction corresponding to a direction intersecting the predetermined direction is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

7. A recording/reading method of a recording/reading system, the recording/reading method comprising:
    controlling ejection of liquid by a first nozzle row and a second nozzle row including a plurality of nozzles configured to eject the liquid to a medium to record a first pattern and a second pattern on the medium, respectively, by causing the first nozzle row and the second nozzle row to perform scan of ejecting the liquid while moving forward or backward along a predetermined main scanning direction, the first pattern including a first overlapping region and a first normal region, the second pattern including a second overlapping region and a second normal region;

reading the first pattern and the second pattern recorded on the medium; and detecting foreign matter by comparing positions of density changes in the first pattern and the second pattern, based on a reading result of the first pattern and the second pattern, wherein the first overlapping region is formed at a position overlapping the second normal region as viewed in a longitudinal direction, the first overlapping region and the second overlapping region each being a region where a raster line having the longitudinal direction corresponding to the main scanning direction is formed by performing the scan m times, the first normal region and the second normal region being a region where the raster line is formed by performing the scan n times, n being smaller than m.

8. A recording/reading method of a recording/reading system, the recording/reading method comprising:

controlling ejection of liquid by a first nozzle row and a second nozzle row, a third nozzle row and a fourth nozzle row in which a plurality of nozzles configured to eject the liquid to a medium are arranged with respect to each other in a predetermined direction to record a first pattern on the medium by controlling the first nozzle row and the second nozzle row and to record a second pattern on the medium by controlling the third nozzle row and the fourth nozzle row, the first pattern including a first overlapping region and a first normal region, the second pattern including a second overlapping region and a second normal region;

reading the first pattern and the second pattern recorded on the medium; and detecting foreign matter by comparing positions of density changes in the first pattern and the second pattern, based on a reading result of the first pattern and the second pattern, wherein the first overlapping region is formed at a position overlapping the second normal region as viewed in a longitudinal direction, the first normal region being a region where a raster line having the longitudinal direction corresponding to a direction intersecting the predetermined direction is formed using the first nozzle row or the second nozzle row, the first overlapping region being a region where the raster line is formed using the first nozzle row and the second nozzle row, the second normal region being a region where the raster line is formed using the third nozzle row or the fourth nozzle row, the second overlapping region being a region where the raster line is formed using the third nozzle row and the fourth nozzle row.

* * * * *